United States Patent
Abi Antoun et al.

(10) Patent No.: US 10,482,280 B2
(45) Date of Patent: Nov. 19, 2019

(54) STRUCTURED TEXT AND PATTERN MATCHING FOR DATA LOSS PREVENTION IN OBJECT-SPECIFIC IMAGE DOMAIN

(71) Applicant: Symantec Corporation, Mountain View, CA (US)

(72) Inventors: Ramzi Abi Antoun, San Francisco, CA (US); Jinyu Zuo, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 312 days.

(21) Appl. No.: 15/419,756

(22) Filed: Jan. 30, 2017

(65) Prior Publication Data
US 2018/0218170 A1 Aug. 2, 2018

(51) Int. Cl.
| | | |
|---|---|---|
| *G06F 21/00* | (2013.01) | |
| *G06F 21/62* | (2013.01) | |
| *G06T 7/11* | (2017.01) | |
| *G06K 9/00* | (2006.01) | |
| *G06K 9/46* | (2006.01) | |
| *G06F 21/34* | (2013.01) | |

(52) U.S. Cl.
CPC .......... *G06F 21/6245* (2013.01); *G06F 21/34* (2013.01); *G06K 9/00228* (2013.01); *G06K 9/00456* (2013.01); *G06K 9/4604* (2013.01); *G06T 7/11* (2017.01); *G06K 2209/01* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 8,863,304 B1* | 10/2014 | Nagarkar | ............ | G06F 21/6245 713/182 |
| 8,867,741 B2* | 10/2014 | McCorkindale | ......... | H04N 1/44 380/243 |
| 9,628,661 B2* | 4/2017 | Dolev | ..................... | G06F 21/64 |
| 2007/0192630 A1* | 8/2007 | Crane | ................. | G06F 21/6245 713/193 |

(Continued)

OTHER PUBLICATIONS

International Search Report and Written Opinion for PCT/US2018/014890 dated Apr. 23, 2018, 7 pages.

*Primary Examiner* — Shin-Hon (Eric) Chen
(74) *Attorney, Agent, or Firm* — Patent Law Works LLP

(57) ABSTRACT

Structured text and pattern matching may be performed for data loss prevention in object-specific image domain. According to some embodiments, a method may include receiving an image, identifying one or more objects in the image based on attributes of the one or more objects, and determining an object type of a first object of the one or more objects by a computing device. The method may include identifying, by the computing device, one or more specific regions of the first object for recognition based on the object type of the first object and recognizing text in the one or more specific regions of the first object. In some embodiments, the method may then include providing, by the computing device, the text recognized in the one or more specific regions of the first object to a security engine, wherein the security engine may be configured to evaluate whether the text comprises sensitive information.

18 Claims, 7 Drawing Sheets

(56) References Cited

U.S. PATENT DOCUMENTS

| | | | |
|---|---|---|---|
| 2008/0002911 A1* | 1/2008 | Eisen | G06F 21/6245 |
| | | | 382/283 |
| 2013/0104199 A1 | 4/2013 | Sprunk | |
| 2014/0153830 A1 | 6/2014 | Amtrup et al. | |
| 2014/0233799 A1 | 8/2014 | Cho et al. | |
| 2016/0246996 A1* | 8/2016 | Khoo | G06F 16/00 |
| 2016/0335524 A1 | 11/2016 | Bremer et al. | |
| 2016/0357732 A1* | 12/2016 | Hsu | G06F 16/2455 |
| 2016/0379184 A1* | 12/2016 | Smith | G06Q 20/042 |
| | | | 705/14.23 |
| 2017/0221154 A1* | 8/2017 | Eftekhari | G06Q 40/123 |

* cited by examiner

STRUCTURED TEXT AND PATTERN MATCHING FOR DATA LOSS PREVENTION IN OBJECT-SPECIFIC IMAGE DOMAIN

TECHNICAL FIELD

This disclosure pertains generally to computer security, and more specifically to automatically evaluating whether objects in an image may contain sensitive information.

BACKGROUND

The leakage of proprietary and/or confidential data is a continuing problem for organizations such as corporations, governments and universities. Contemporary ubiquitous remote network access to an organization's computers increases productivity and is convenient, but at the same time creates ever greater challenges for protecting the data from being accessed by unauthorized parties such as competitors or criminals. Leakage of enterprise data can result both from intentional activity by unscrupulous employees, as well as unintentional but negligent actions of employees not following robust security procedures Organizations lack visibility into the access and flow of sensitive documents and information. Administrators lack tools for tracking data access and usage. Tracking the access and flow of enterprise data and preventing leakage are more difficult than ever. Yet, organizations rightly want to limit the access and use of confidential data according to an enterprise-level information control policy.

Some technologies for tracking access and flow of enterprise data compare strings of text to a database of defined information or types of information. However, these technologies do not extend to circumstances where the information is contained in an image, such as an image of one or more bank checks, credit cards, or driver's licenses.

Conventional optical character recognition (OCR) technologies are not capable of accurately determining the contents of images, including whether an image contains sensitive information, quickly, accurately, and/or efficiently enough to satisfy the demands of a data loss prevention (DLP) system. For instance, some conventional image analysis requires substantial computing resources resulting in unacceptable computing resource cost and latency, especially for enterprise applications. Furthermore, conventional systems are limited in their ability to capture, process, and analyze complicated images.

It would be desirable to address these issues.

SUMMARY

A computing device may receive an image and one or more objects in the image may be identified based on the attributes of the one or more objects.

An object type of a first object of the one or more objects may be determined by the computing device. An object type of a second object of the one or more objects may also be determined. In some embodiments, the attributes may comprise dimensions of the first object. In some embodiments, the object type of the first object may comprise a check and, in some instances, the check may be identified based on attributes comprising MICR (Magnetic Ink Character Recognition) characters. In some embodiments, the object type of the first object may comprise a photo identification card and, in some instances, the photo identification card may be identified based on attributes comprising an image of a face at a given location on the object.

One or more specific regions of the first object may be identified for recognition based on the object type of the first object by the computing device. One or more specific regions of the second object may also be identified for recognition based on the object type of the second object. A location of each specific region of the one or more specific regions may be determined based on a known layout of the object type. In some embodiments, a rotation or a perspective of the one or more specific regions may be adjusted using a determined rotation or perspective of the first object in order to facilitate text recognition within the one or more specific regions of the first object.

Text in the one or more specific regions of the first object may be recognized by the computing device. Text in the one or more specific regions of the second object may also be recognized. The text recognized in each specific region of the one or more specific regions of the first object may be tagged with metadata based on a location of the specific region on the first object. The metadata may indicate a data type expected to be found at the location of the specific region on an object having the object type of the first object. In some embodiments, the security engine may be further configured to determine whether the text comprises sensitive information based on the metadata tagged on the text.

The text recognized in the one or more specific regions of the first object may be provided to a security engine by the computing device. The text in the one or more specific regions of the second object may also be provided to the security engine. The security engine may be configured to evaluate whether the text comprises sensitive information. In some embodiments, the security engine may evaluate whether the text comprises sensitive information by matching the text in the one or more specific regions of the first object against a database of defined sensitive information.

In some embodiments, it may be determined that the image contains sensitive information based on the object type of the first object and the object type of the second object. In some embodiments, it may be determined that the image contains sensitive information responsive to the object type of the first object being a first particular type and the object type of the second object being a second, different particular object type.

In some embodiments, the first object may be classified as not including sensitive information by the computing device in response to the security engine determining that the text in the one or more specific regions of the first object does not comprise sensitive information.

In some embodiments, whether text is present in the one or more specific regions of the first object may be determined and the object may be classified as not including sensitive information in response to determining that no text is present in the one or more specific regions.

In some embodiments, the image may be automatically blocked from being electronically transferred in response to the text recognized in the one or more specific regions of the first object being evaluated as including sensitive information. In some embodiments, an electronic message may be automatically transmitted to an administrator in response to the text recognized in the one or more specific regions of the first object being evaluated as including sensitive information.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
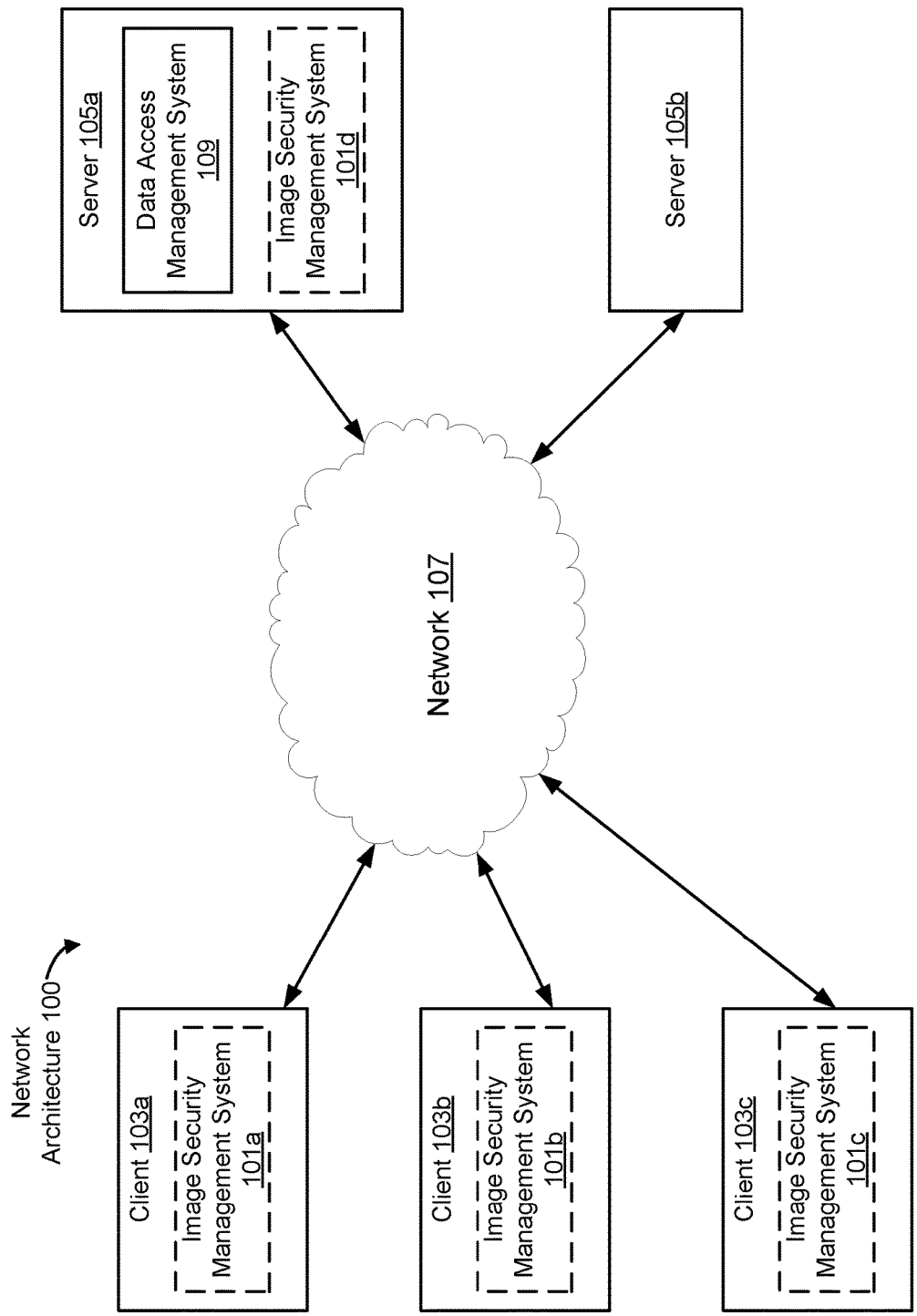
FIG. 1 is a block diagram of an exemplary network architecture in which image security management system can be implemented, according to some embodiments.

The figures depict various embodiments for purposes of illustration only. One skilled in the art will readily recognize from the following discussion that alternative embodiments of the structures and methods illustrated herein may be employed without departing from the principles described herein.

DESCRIPTION

An image security management system 101 is described herein that can perform structured text and pattern matching for data loss prevention in object-specific image domain. For example, the image security management system 101 can determine whether images contain sensitive information in violation of defined security policies.

The techniques described herein may allow existing rules in a text based data loss prevention (DLP) system (e.g., the image security management system 101 and the data access management system 109) to be extended to images. A DLP system may include certain rules or security policies that determine whether text includes sensitive information (e.g., confidential or personally identifiable information). A DLP system, such as is described herein, may scan thousands or millions of images in a very short time, so a low latency and cost, and a low false negative rate are particularly important.

The techniques described herein overcome the limitations of current methods of scanning images, such as scanning an entire image using optical character recognition (also referred to herein as OCR). For example, as described in further detail elsewhere herein, performing optical character recognition in an entire image would be computationally expensive and result in unacceptable latency, for example, in an enterprise level DLP system. Further, optical character recognition has difficulty recognizing text when the image quality is poor (e.g., due to rotation, perspective, orientation, illumination, clarity, etc.).

The techniques described herein may use computer vision techniques, object specific detection, text-based matching, and DLP rules to evaluate whether an image contains sensitive information. For example, the techniques may include using robust computer vision object detectors to arrive at an understanding of an object prior to text recognition that can be used to transcribe specific areas of interest of the object into text. This technology is particularly beneficial as it is highly efficient at passing images with no sensitive information, identifying sensitive information in challenging images (e.g., with poor image quality, obstructions, multiple objects, etc.), and processing an extremely large volume of data with little latency.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

It should be noted that the example objects (e.g., bank checks and drivers licenses), attributes, etc., described herein are provided as illustrative examples, and that the technology described herein may be applied to other suitable objects (and corresponding attributes). For example, other examples of objects for which the techniques described herein can be used may include passports, social security cards, bank statements, tax documents, loan documents, or other objects that may contain confidential or personally identifiable information and that have predictable or recurring layouts and/or attributes.

FIG. 1 is a block diagram illustrating an exemplary network architecture 100 in which an image security management system 101 can be implemented. The illustrated network architecture 100 comprises multiple clients 103a, 103b and 103c, as well as multiple servers 105a and 105b. In FIG. 1, a data access management system 109 is illustrated as residing on a server 105a, and an image security management system 101a, 101b, 101c, and/or 101d is illustrated as residing one or more of a client 103a, 103b, 103c, and a server 105a, respectively. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown), etc. Clients 103 can be in the form of computing devices, such as servers, desktop or laptop computers, tablet computers, smart phones, wearable devices, etc., which are computer systems 210 capable of connecting to a network 107 and running applications.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

The example network architecture 100 illustrated in FIG. 1 shows a computer network 107; an image security management system 101 operable on, for example, a client 103a, and a data access management system 109 operable on the server 105a. The client 103 may represent a computer system 210, for example, as described elsewhere herein. The servers 105a and 105b may represent first and/or third party servers for implementing the technology described herein, for example. The image security management system 101 may represent an application or code operable on the client 103 for determining whether images contain sensitive information and performing other operations described herein and, in some instances, providing data representing the same to the image security management system 101.

The image security management system 101 may include computer logic operable to receive or retrieve and process data from the clients 103 and/or other entities of the network architecture 100. The image security management system 101 may use the data from the clients 103, for example, to evaluate whether images contain sensitive information according to defined policies. For instance, the image security management system 101 may, as described elsewhere herein, use computer vision to identify objects in images, extract text from specific regions of the objects based on a known layout of the objects, and, in some embodiments, use the extracted text to determine if there is sensitive information in the image.

The data access management system 109 may include computer logic operable to receive or retrieve and process data from the clients 103 and/or other entities of the network architecture 100. The data access management system 109 may use the data from the clients 103, for example, to define and manage policies, rules, or specific data, etc. that qualifies as sensitive information. For instance, the data access management system 109 may allow an administrator to manage access and flow of data among clients 103 and, in some instance, track the flow of sensitive information and notify the administrator or other stakeholder of access or transfer of data containing sensitive information in violation of defined policies.

It should be understood that while these and other embodiments are described throughout this specification, other embodiments and uses for the technology described herein are possible and contemplated.

Figure 2:
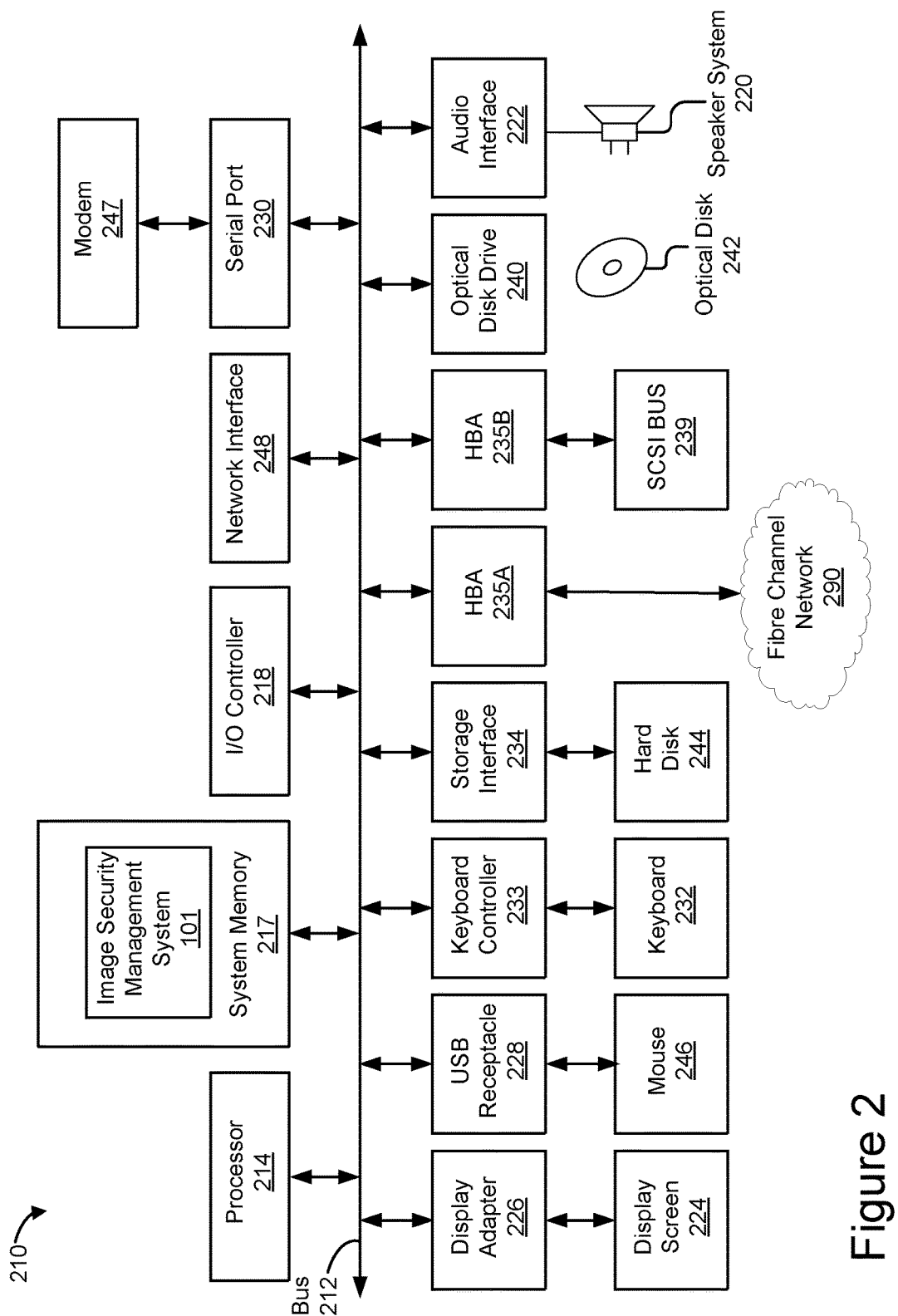
FIG. 2 is a block diagram of a computer system suitable for implementing an image security management system, according to some embodiments.

FIG. 2 is a block diagram of a computer system 210 suitable for implementing an image security management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 232 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above, may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs (e.g., in some instances, the image security management system 101, the data access management system 109, etc.) can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the image security management system 101 is illustrated as residing in system memory 217. The workings of the image security management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

Figure 3:
FIG. 3 is a block diagram of an image security management system, according to some embodiments.

FIG. 3 illustrates components of an image security management system 101, according to some embodiments. As described above, the functionalities of the image security management system 101 can reside on a server 105, a client 103, or be distributed between multiple computer systems 210, including within a cloud-based computing environment in which the functionality of the image security management system 101 is provided as a service over a network 107. It is to be understood that although the image security management system 101 is illustrated in FIG. 3 as a single entity, the illustrated image security management system 101 may represent a collection of functionalities, which can be instantiated as a single or multiple modules as desired (an instantiation of specific, multiple modules of the image security management system 101 is illustrated in FIG. 3). It is to be understood that the modules of the image security management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the image security management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In different embodiments, the image security management system 101 may be registered with the data access management system 109. Additionally, the image security management system 101 can be in the form of functionality provided by an application running on a computing device, which in turn can, but need not be, a more comprehensive security application. It is to be understood that although the image security management system 101 is illustrated in FIG. 3 as a single entity, the image security management system 101 represents a collection of functionalities, which can be instantiated as a single or multiple modules as desired.

In some embodiments, the receiving module 309, object identification module 311, object analysis module 313, text recognition module 315, classification module 317, security engine 319, and/or security action module 321 may be implemented as software, hardware, or a combination of these. In some embodiments, the receiving module 309, object identification module 311, object analysis module 313, text recognition module 315, classification module 317, security engine 319, and/or security action module 321 may be communicatively coupled by the bus 212 and/or the processor(s) 214 to one another and/or the other components of the computer system 210. In some embodiments, one or more of the components 309, 311, 313, 315, 317, 319, 321 are sets of instructions executable by the processor(s) 214. In further embodiments, one or more of the components 309, 311, 313, 315, 317, 319, and 321 are storable in the memory(ies) 217 and are accessible and executable by the processor(s) 214. In any of the foregoing embodiments, these components 309, 311, 313, 315, 317, 319, and 321 may be adapted for cooperation and communication with the processor(s) 214 and other components of the computer system 210.

In some embodiments, the receiving module 309, object identification module 311, object analysis module 313, text recognition module 315, classification module 317, security engine 319, and/or security action module 321 may include computer logic operable to perform the operations described in further detail throughout this specification, for example, in reference to FIGS. 4 through 7. For example, the receiving module 309 may be programmed to receive an image; the object identification module 311 may be programmed to identify objects in the image based on attributes of the objects; the object analysis module 313 may be programmed to determine an object type of an object and identify specific regions of the object for recognition based on the object type; the text recognition module 315 may be programmed to recognize text in the specific regions and provide the text to the security engine 319, the classification module 317 (and/or, in some instances, the security engine 319) may be programmed to classify the object as not including sensitive information (e.g., based on input from the security engine 319, no text being present in the specific regions, one or more specific object types being present in the image, etc.); the security engine 319 may be configured to evaluate whether the text comprises secure information; and the security action module 321 may be programmed to perform an action in response to the image containing one or more object with sensitive information (e.g., that violate defined security rules), such as automatically blocking image transfer or access or transmitting an electronic alert to a computing device of an administrator.

Figure 4:
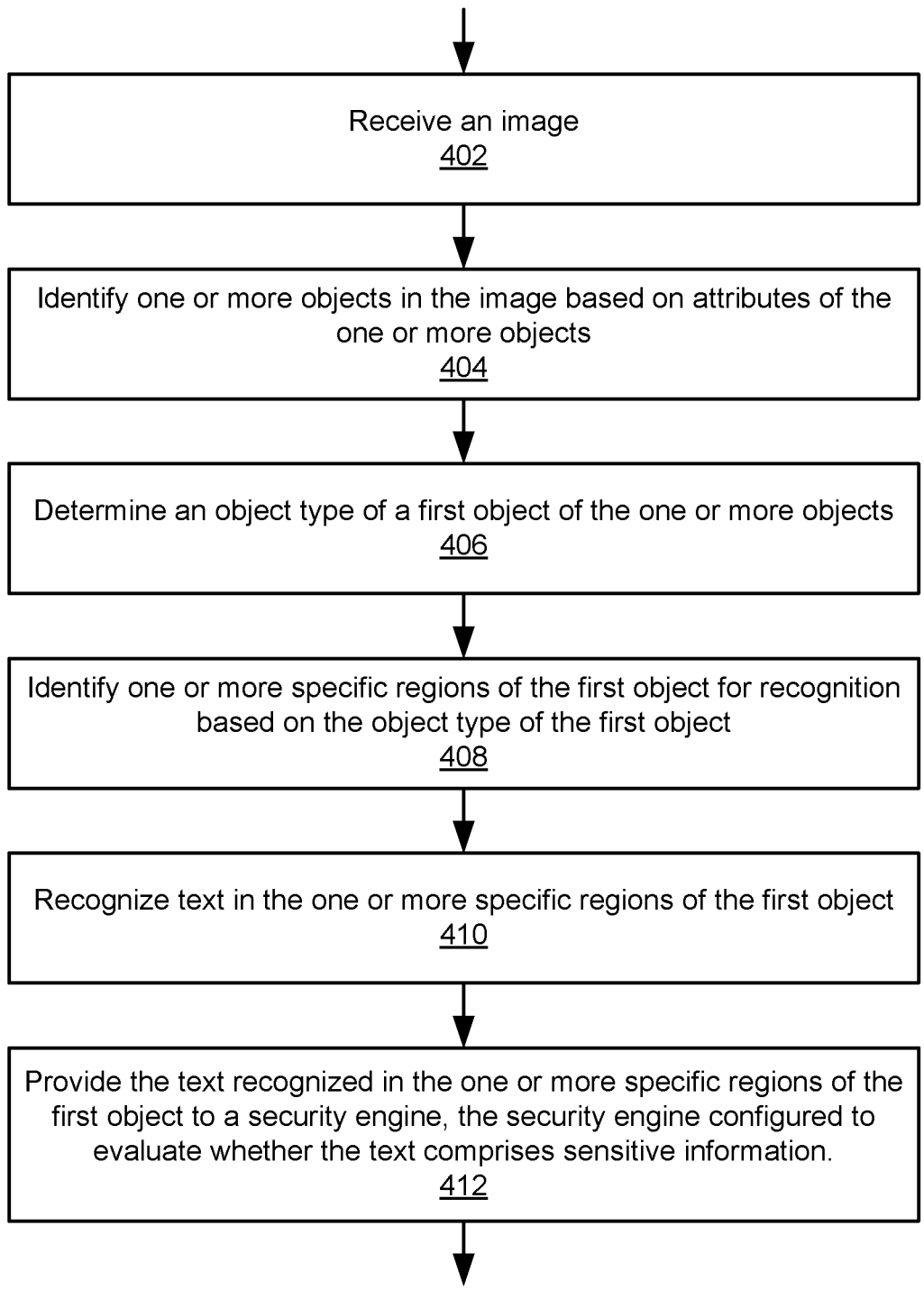
FIG. 4 is a flowchart of an example method for performing structured text and pattern matching for data loss prevention in object-specific image domain, according to some embodiments.

FIG. 4 is a flowchart of an example method for performing structured text and pattern matching for data loss prevention in object-specific image domain, according to some embodiments.

At 402, the receiving module 309 receives an image. The receiving module 309 may receive an image, for example, as a database is scanned, as a user accesses or attempts to transfer an image, etc. In some embodiments, the receiving module 309, or another security scanning module (not shown) coupled to the receiving module 309, may be configured to run scans on local or remote data stores. For example, the image security management system 101 may crawl a data store (e.g., a database, hard drive, etc.) on a local, virtual, or remote machine to scan all or a subset of documents on the data storage of the machine. For instance, the image security management system 101 may be configured to actively, periodically, or in response to some impetus, scan a database for image files and analyze the image files according to the techniques described herein.

In some embodiments, the receiving module 309 may monitor interaction with data by the client 103. For example, an image may be received in response to an action, such as obtaining, opening, processing, or sharing of data by an application on the client 103. Monitoring can be implemented by the receiving module 309 or by a separate monitoring module or application (not shown). In some instances, the monitoring can be implemented by intercepting or otherwise hooking system calls that perform data access functionality, and wrapping them with code that executes the desired monitoring functionality. For example, calls that implement network communication can be intercepted, so as to detect and monitor data access and transmission of potentially sensitive data. Similarly, calls to access a file system (e.g., open, read, write, seek) can be intercepted, to detect and monitor client level interaction with local copies of data. Although these examples are provided, other implementation mechanics for receiving and/or monitoring data (e.g., images) can be used in other embodiments.

At 404, the object identification module 311 identifies one or more objects in the image, based on attributes of the one or more objects. At 406, the object analysis module 313 determines an object type of one or more of the objects. In some embodiments, the object identification module 311 uses computer vision techniques to identify the presence and/or identity of objects in the image, such as specific attributes of an image that are associated with different types of objects. For example, the object identification module 311 may recognize an object in an image based on attributes such as colors, shapes, characters, patterns, etc. For example, as described in further detail in reference to FIG. 5, the object can include a bank check that may be recognized using attributes such as the dimensions of the check (e.g., a rectangular shape having a certain aspect ratio), Magnetic Ink Character Recognition (MICR) font, characters, or glyphs, presence of horizontal lines down the center of the check, or other attributes of checks. In another example, the object may include a photo identification card (e.g., a driver's license), as described in further detail in reference to FIGS. 6 and 7, that can be recognized using attributes such as an image of a face (e.g., based on facial recognition) at a given location of the object, particular colors, symbols, barcodes (e.g., 1 dimensional, 2 dimensional, etc.) or layouts common to photo identification cards. For example, the image security management system 101 may be configured to recognize a face on a photo identification card using a facial recognition algorithm and determine the name of the individual whose card it is, using the techniques described herein. It is to be understood that the specific attributes used to identify different object types can vary between object type and embodiments, as desired.

In some embodiments, the object identification module 311 may have identified multiple objects in a single image, in which instance, the object analysis module 313 may analyze the objects either separately, or as a group. For example, the object analysis module 313 may first determine an object type of an object in the image and then determine an object type of a second object in the image.

The operations at 406 may be combined with the operations at 404. For example, an object may be identified using particular attributes common to that type of object, such as a MICR character at the bottom of the object (e.g., for a check) or an image of a face along the left or right side of a card shaped object (e.g., for a driver's license).

The object type can be determined at any level of granularity. For example, in some embodiments, the object type can be determined at low level of granularity (e.g., any photo identification card), an intermediate level of granularity (e.g., specifically a driver's license), or a high level of granularity (e.g., only driver's licenses from Texas). The level of granularity may be a selectable parameter set by a security policy and may affect the specificity with which objects may be identified, the level of security applied, and the amount of latency and computing resources used by the image security management system 101. For example, the object analysis module 313 may determine that image contains a photo identification card based the presence of an image of a face and/or the object analysis module 313 may determine that an image contains a Texas driver's license based on the particular layout and/or color scheme (or other attributes) common to Texas driver's licenses. It should be noted that although text recognition may be used to determine the object type at a high level of granularity, the object type may be determined before any text/character recognition is applied to the image/object.

In some embodiments, the object analysis module 313 may determine that the object contains sensitive information based on the object type of the object. For example, it may be determined that the object is a check and that any check constitutes sensitive information under a defined security policy. Accordingly, the image security management system 101 may determine that the image contains sensitive information without performing textual recognition or other additional analysis. In some embodiments, an administrator may define a security policy that states that if two objects of particular object types are contained in the same image (or even in separate images in the same document or e-mail), then the image contains sensitive information in violation of the security policy. For example, if the object analysis module 313 determines that the image contains an object of a first object type (e.g., a social security card) and a second object of a second object type (e.g., a driver's license), it may be determined that the image contains sensitive information. For instance, it may be determined that the image contains sensitive information responsive to the object type of the first object being a first particular type and the object of the second object being a second particular object type.

At 408, the object analysis module 313 may identify one or more specific regions of each object in an image for recognition based on the object type of the object. Once it is known what type of object is in the image, knowledge about the attributes (features, layout, etc.) of the object can be used to extract fields of interest (e.g., specific regions of the object) based on its layout. The location of each specific region may be determined based on a known layout of an object having a particular object type. For example, once it is determined that the image includes a check, then the layout of the check can be used to extract specific regions of interest (e.g., the location of a name and address, routing numbers, account numbers, etc.), for example, as described in further detail in reference to FIG. 5.

In some embodiments, the specific regions may have associated thereto metadata describing the specific region and/or the contents expected to be found therein. The metadata of the specific region may be associated with text recognized in that specific region (as described below), for instance, the metadata may indicate a data type expected to be found at the location of the specific region on an object having that object type. For example, the object analysis module 313 (or, in some instances, the text recognition module 315) may tag the text recognized in each specific region of the one or more specific regions of the object with metadata based on a location of the specific region on the object. For instance, the specific region at the top left of a check may include metadata indicating that that specific region includes a name and address.

Accordingly, in some embodiments, even prior to text recognition, the image security management system 101 may know that text may include a routing number or checking number (or other information) before the text in those specific regions is even recognized. This may further improve the accuracy and/or efficiency of text recognition, for example, by allowing the text recognition module 315 to know that it should be looking for particular symbols or text (e.g., MICR characters, as described elsewhere herein).

In some embodiments, the object analysis module 313 may adjust the image or the specific regions of the object to improve text/character recognition. For example, an object in an image may not be well situated for text recognition, due to the object/image's rotation, perspective, orientation, lighting, clarity, coloring, etc. Accordingly, the object analysis module 313 (or another component of the image security management system 101) may adjust the image, object, and/or specific region(s) in preparation for text recognition, although this may not be necessary. For instance, the object analysis module 313 may adjust a rotation or a perspective (or other image attribute, such as clarity, orientation, etc.) of the one or more specific regions (or of the object or image) using a determined rotation or perspective of the object in order to facilitate text recognition within the one or more specific regions of the object. For example this functionality is described in further detail in reference to FIG. 7.

At 410, the text recognition module 315 may recognize text in the one or more specific regions of the object. The text recognition module 315 converts images into text. For example, in some embodiments, the text recognition module 315 may perform targeted optical character recognition. In some embodiments, the text recognition module 315 may perform image analysis to recognize expected characters (e.g., based on object types, metadata labels, etc.) in the specific regions, for example, the text recognition module may expect to find MICR character or glyphs at the bottom of a check, so the text recognition module 315 may search specifically for those special characters or glyphs without running the image or specific region though an OCR engine. By searching for these expected characters, fonts, logos, features, etc., the text recognition module 315 may more efficiently determine whether sensitive information is present, depending on the constraints of the security policy.

In some embodiments, the text recognition module 315 may use targeted optical character recognition. In other words, the text recognition module 315 may use the object type and/or expected characters, attributes, or features of the specific region to more accurately and/or efficiently perform the optical character recognition. For example, because the image security management system 101 knows the layout of the object and provides only the specific region for text recognition, the text recognition module 315 may not spend the time and computing resources to scan the entire image or the entire object for text. Additionally, in some embodiments, the text recognition module 315 may use expected information for the identified object and/or particular specific region to improve text recognition. For example, once an object and a specific region have been identified, the text recognition module 315 may limit its analysis to expected characters, fonts, features, etc. For instance, the text recognition module 315 may expect to find a logo or font with the name of a state at the top of the driver's license. This is particularly beneficial over ordinary OCR, because, in this example, many states have particular fonts or logos that would fail to be recognized under OCR. By limiting the potential range of text according to these techniques, the text recognition module 315 can recognize the text (e.g., with the state) far more quickly and accurately, without the errors associated with OCR. For instance, OCR may recognize only "labam" on an Alabama license, because the first and last A in Alabama are stylized.

In some embodiments, the text recognition module 315 may determine whether text is present in the one or more specific regions of the object and, in response to determining that no text is present in the one or more specific regions, classify the object as not including sensitive information in violation of a security policy. For example, in some embodiments, the text recognition module 315 may merely determine whether text is present in a specific region and the object may be classified (e.g., by the text recognition module 315 or the classification module 317) as containing sensitive information. Similarly, if no text is present in the specific region(s), it may be determined that no sensitive information is present and the object may be classified as not containing sensitive information without performing additional analysis (e.g., by the security engine 319), thereby further reducing latency and consumption of computer resources. For example, a security policy may indicate that only those checks where a routing and bank account number are shown contain sensitive information in violation of the security policy. Accordingly, in this example, once the text recognition module 315 determines that no text is present at the bottom of the check (e.g., as in a case where the routing and account numbers were redacted), then the object may be classified as not containing sensitive information and no further processing is performed on the object or, in instances where the check is the only object in an image, on the image.

Similarly, in some embodiments, once the image security management system 101 determines that part of the image (e.g., an object, a specific region, a piece of text, etc.) contains sensitive information in violation of a security policy, the image security system 101 (e.g., the classification module 317 or security engine 319) may classify the image as containing sensitive information and cease to process (e.g., identify objects, identify specific regions, recognize text, check the text for sensitive information) any remainder of the specific regions and/or objects in the image, thereby further improving computational efficiency.

At 412, the text recognition module 315 may provide the text recognized in the one or more specific regions of the object to a security engine 319, which may be configured to evaluate whether the text comprises sensitive information.

In some embodiments, the security engine 319 may be configured to evaluate whether the text comprises sensitive information and, in some embodiments, classify the text, specific regions, objects, and/or images as containing or not containing sensitive information. In some embodiments, the security engine 319 may use text pattern matching (e.g., based on regular expression matching of preloaded patterns), for example, using a text string to match against particular information or types of information (e.g., stored in an information database or defined by rules) and cause an incident or alert indicating that sensitive information is present. For example, the security engine 319 may have a data identifier using a regular expression where a rule may be created, such as for a social security number. A text string or document (e.g., an e-mail) may be scanned for numbers that look like a social security number and that number, text string, or document may be flagged as containing or potentially containing sensitive information.

In some embodiments, the security engine may evaluate whether the text comprises sensitive information by matching the text in the one or more specific regions of the object against a database of defined sensitive information. For example, in some embodiments, the security engine 319 may use exact data matching, for example, for structured data. Exact data matching is similar to regular expression matching, but allows deeper analysis. In exact data matching an administrator may define a set of data in a tabular form. For example, a table may contain confidential (e.g., sensitive) data for which the security engine 319 may search. For example, a table in an exact data matching database may define data indexed by type and may be searched for structured or unstructured data. An example of an exact data matching table, where rows correspond to an individual (or other data object) and columns correspond to attributes, is included below:

| First Name | Last Name | Account # | Social Security | Street |
|---|---|---|---|---|
| John | Smith | 123-43 | 123791543 | 143 Lane Street |
| Jane | Doe | 432-42 | 432761432 | 1000 Ellis Street |
| Janet | Lee | 423-41 | 843173928 | 500 Forbes Street |

Data/text searched using exact data matching can be a document, e-mail, or any form of free flowing text. For example, if particular combinations of attributes belonging to an individual are found in a single document, object, or image, according to defined security policies, an incident may be created (e.g., the text, specific region, object, image, or document or file in which an image is contained is classified as containing sensitive information). For instance, a policy may state that a document, image, etc., contains sensitive information if it includes both an individual's first or last name and their account number or social security number.

In some embodiments, the security engine 319 may be configured to determine whether the text comprises sensitive information based on metadata tagged in the text (e.g., indicating the specific region from which the text was taken). For example, the security engine 319 may match a name taken from a specific region expected to contain a name against a database of names, and/or a credit card number taken from a specific region expected to contain a credit card number against a database of credit card numbers. In another embodiment, the security engine 319 may determine based on the metadata/labels associated with the text that the object contains sensitive information, for example, the presence of text tagged as a name and text tagged as a credit card number on the same object may, based on these tags, cause the security engine 319 to classify the object as containing sensitive information (e.g., in violation of a security policy) without matching the text.

Accordingly, the security engine 319 may classify a specific region, object, and/or image as containing or not containing sensitive information, for example, based on a security policy.

In some embodiments, in response to an unauthorized access, transfer, etc., of sensitive information (e.g., an image containing sensitive information), a security action module 321 may take an action based on the image/object being transferred, accessed, etc., containing sensitive information. For example, the security action module 321 may automatically block the image from being electronically transferred in response to the text recognized in the one or more specific regions of the object being evaluated as including sensitive information. Additionally or alternatively, the security action module 321 may automatically transmit an electronic message (e.g., an e-mail, push notification, short text message, etc.) to a computing device of an administrator in response to the text recognized in the one or more specific regions of the object being evaluated as including sensitive information.

Figure 5:
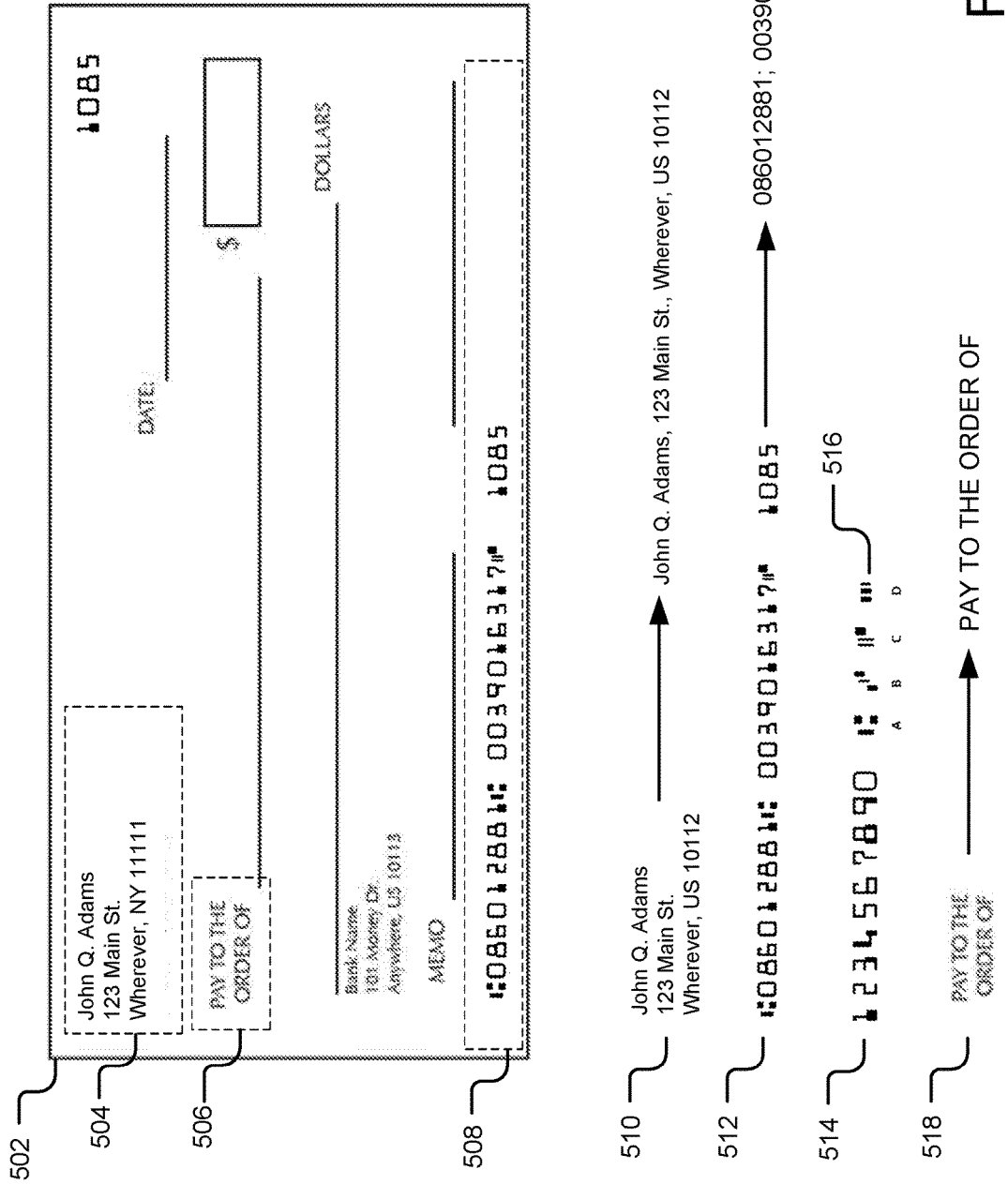
FIGS. 5, 6, and 7 are illustrations of example objects that may be analyzed for sensitive information, according to some embodiments.

FIG. 5 is an illustration of an example check 502 that may be contained in an image being analyzed for sensitive information, according to some embodiments. Given an image containing a check 502, the object identification module 311 and object analysis module 313 can use computer vision techniques to detect the check (e.g., based on dimensions, shape, layout, presence of graphical elements, fonts, or MICR characters). The object analysis module 313 knows the layout of a check including where specific regions 504, 506, and 508 are located on the check (504, 506, and 508 are provided merely as example specific regions).

The text recognition module 315 may then extract text from the specific regions 504, 506, and 508. For instance, the image contained in the specific region 504 may be transcribed into a text string indicating a name and address, as shown at 510; the image contained in the specific region 506 may be transcribed into a text string "pay to the order of (e.g., which may be useful for identifying the object as a check); and the image contained in the specific region 508 may be transcribed into a text string containing the routing, bank account, and check numbers, as shown at 512.

In some embodiments, the image security management system 101 may use the MICR number font shown at 514, the MICR glyphs shown at 516, and/or the information expected to be found in the specific region 508 (e.g., based on the location of the specific region/labels in metadata for the region or the text found in the region, as described elsewhere herein) to identify the check and determine that the check contains sensitive information in the form of a routing number, account number, and/or check number. For instance, the text recognition module 315 may recognize the MICR numbers 514 in the specific region 508 and use the MICR glyphs 516 to recognize and/or differentiate the routing number, account number, and check number.

The process performed to recognize sensitive information on the check 502, according to the techniques described herein, is different from that used for existing mobile banking applications, which may be used to remotely deposit checks. In particular, mobile banking applications are designed to recognize only a single check from a cooperative user. For instance, a mobile banking application is capable of analyzing text (e.g., a routing number) on a single check that is nearly perfectly aligned in an image (e.g., with the frame of the image or with alignment marks in the mobile banking application), and without background information in the image. Additionally, mobile banking applications can be relatively inefficient, because they are only required to scan a single image/check at a time.

The techniques described herein may be used to robustly and efficiently detect one or multiple checks in an image, even if the image is challenging (e.g., due to rotation, perspective, number of objects present in the image, number of checks present in the image, obstructions, the check is not fully contained in the image, other objects are also in the image, etc.) due to, for example, an uncooperative user taking, accessing, or using the image. For example, the image security management system 101 may detect the check based on the presence of one or more MICR characters, extract the characters as text strings, and then check the text strings for sensitive information.

For example, the techniques described herein can recognize objects in challenging situations, and are highly efficient. The DLP system may find sensitive information in images taken by uncooperative users, and may scan many (e.g., hundreds, thousands, millions) of images at a certain time. In some instances, most of the images scanned may not contain sensitive information, so the images that do not violate security policies should be passed as rapidly as possible and with few to no false negatives. For example, the image security management system 101 may be configured to be relatively conservative in thresholds of certainty with which images are analyzed to have sensitive information in violation of security policies, but the image security management system 101 may also be configured to pass (e.g., classify as not containing sensitive information) images as rapidly and as early in the analysis as possible to decrease latency and demand on computational resources.

Figure 6:
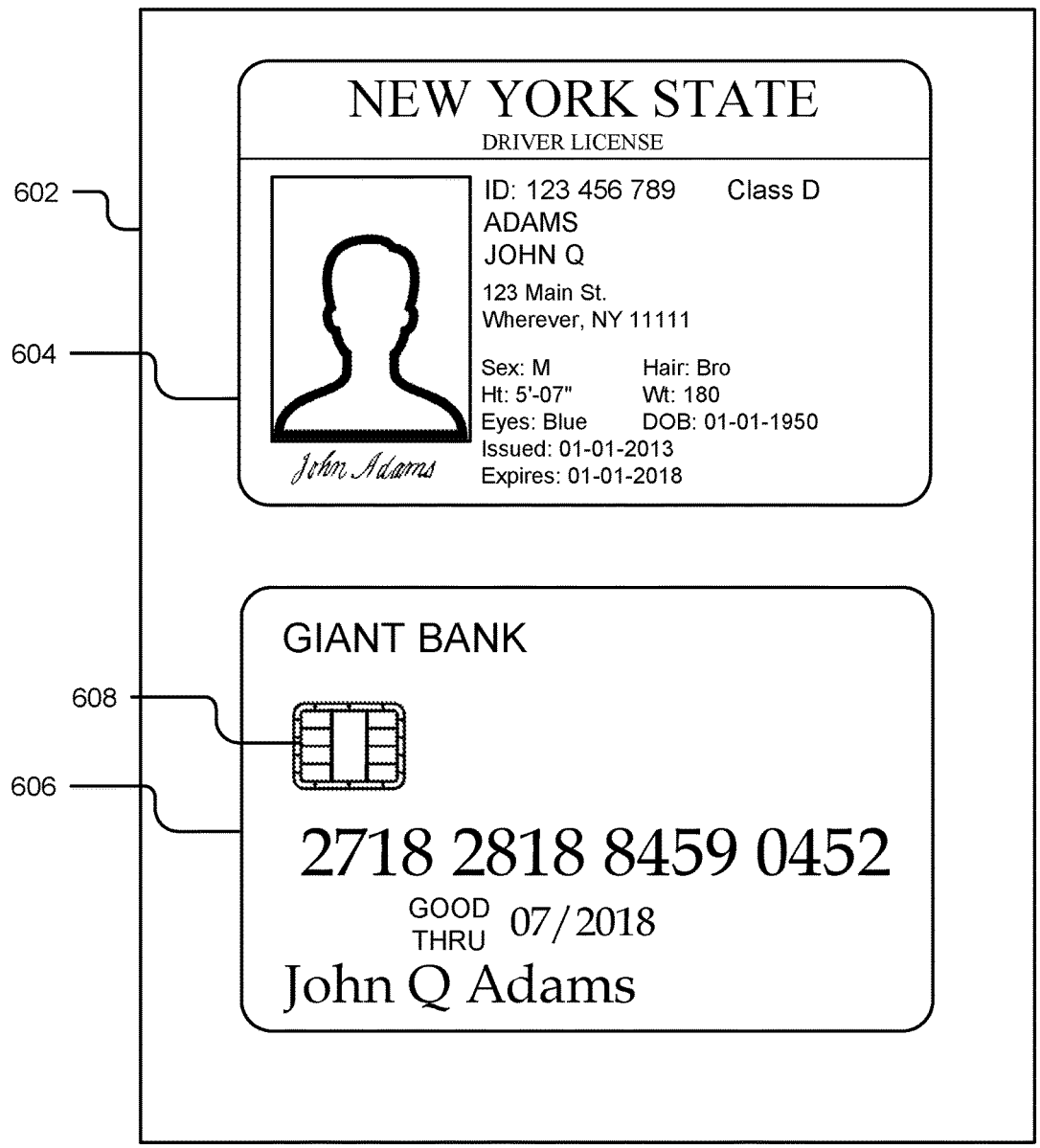

FIG. 6 is an illustration of an image 602 containing two objects—a driver's license 604 and a credit card 606—that may be analyzed for sensitive information, according to some embodiments. The techniques described herein may be used to detect a photo identification card (e.g., driver's license, passport, etc.). For example, the image security management system 101 may identify the presence of one or more driver's licenses in an image by detecting the presence of unique features, such as a face, particular graphics (e.g., logos, colors, graphics, layouts, barcodes, quick response codes, etc., used by various states) and other features unique to a driver's license. Once the object has been identified, potentially sensitive information can be returned, such as a first name, last name, address, ID number, state, etc., in a text string to the security engine 319. This sensitive information can be obtained using object specific knowledge, such as known layouts of the driver's licenses of various states, for example.

Similarly, the image security management system 101 may additionally or alternatively identify a credit card 606 in an image (e.g., based on the features of the credit card, such as a credit card number, card issuer logo, an EMV (Europay, MasterCard, Visa) chip 608, etc.).

In some embodiments, the image security management system 101 may be configured to use facial recognition software or algorithms to scan objects for faces. For instance, the image security management system 101 may identify a face in an object, identify a specific region containing a name of the object using the techniques described above, and then transcribe the text in the specific region to determine the name of the person represented by the face on the object. Accordingly, the image security management system 101 may be configured to match faces with names.

In some embodiments, a security policy may be defined to classify an image containing two or more objects of particular object types as containing sensitive information. For instance, the security policy may state that any image containing an image of both a photo ID and a credit card contains sensitive information. Accordingly, the image security management system 101 may analyze the image to determine whether the image contains these particular object types without necessarily performing text recognition. In another example embodiment, the security policy may state that any image containing an image of a photo ID of a particular individual and a credit card of that same individual contains sensitive information. Accordingly, in the depicted example, the image security management system 101 may not only identify the object types of the driver's license 604 and the credit card 606, but may also continue to extract and check the text, according to the techniques described herein, to determine that both objects 604 and 606 are for the same individual (e.g., John Adams).

Figure 7:
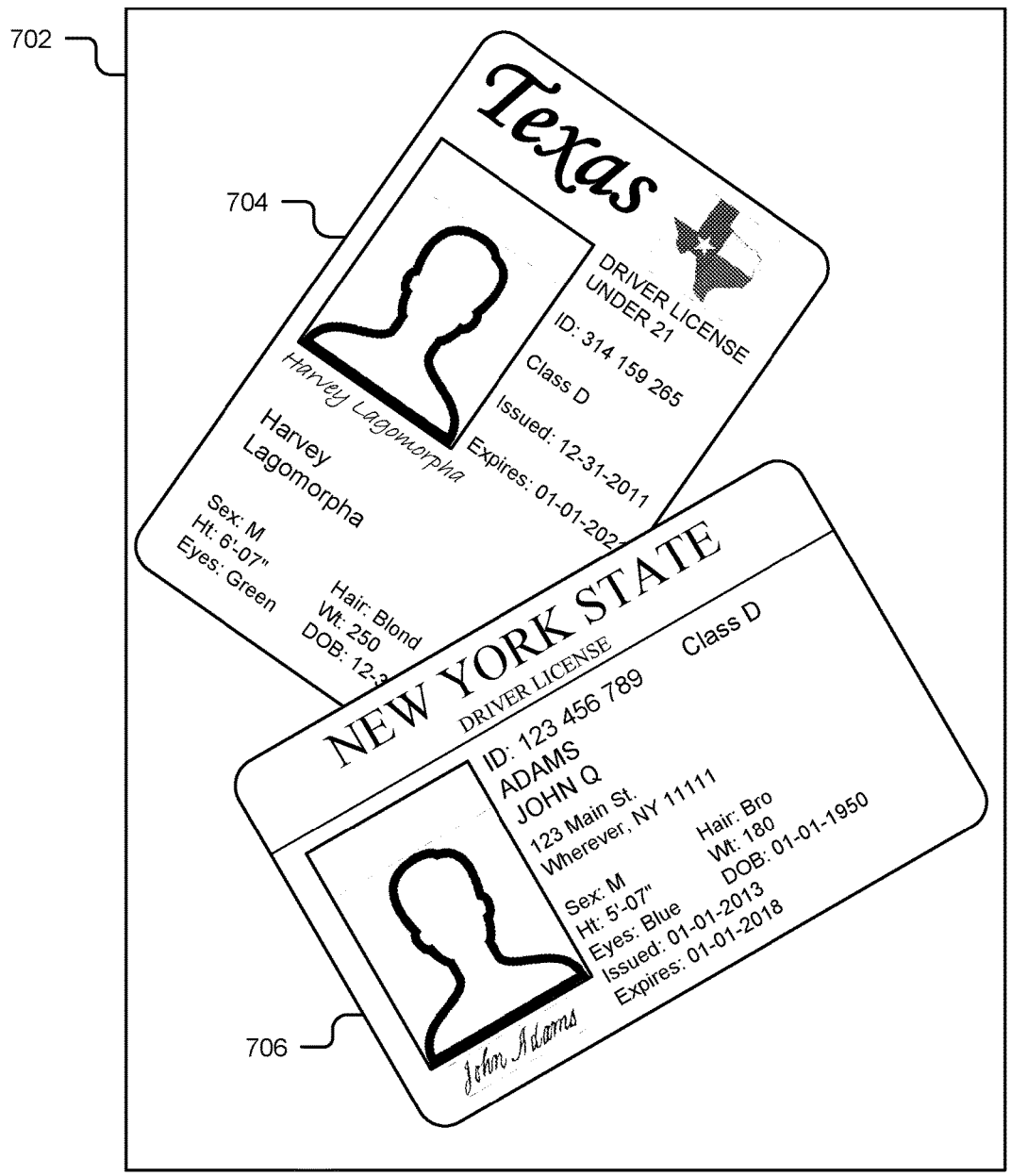

FIG. 7 is an illustration of an image 702 containing two objects—a first driver's license 704 and a second driver's license 706—that may be analyzed for sensitive information, according to some embodiments. As illustrated in FIG. 7, the objects 704 and 706 are rotated in the image and the object 704 is partially obscured. Accordingly, the image security management system 101 may rotate objects and/or specific regions, as described herein. Similarly, the image security management system 101 may independently determine whether each object contains sensitive information. For example, if the image security management system 101 determines that the object 704 does not contain sensitive information, it may continue to determine whether the object 706 contains sensitive information, according to the techniques described herein.

In some embodiments, the object identification module 311 may identify the object at a high enough level of granularity to identify the particular layout of a particular subgroup of the object type(s). For instance, a Texas under 21 driver's license 704 may have a different layout than a New York State driver's license 706, so the object identification module 311 may determine which state the driver's license is from, so that the object analysis module 313 can correctly determine the location/layout of the specific regions for analysis. Accordingly, a prior understanding of the object and its layout may be used to improve the efficiency, and overcome limitations inherent in optical character recognition.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
    receiving, by a computing device, an image;
    identifying, by the computing device, multiple physical objects represented in the image based on attributes of the multiple physical objects;
    determining, by the computing device, an object type of a first object of the multiple physical objects;
    determining, by the computing device, an object type of a second object of the multiple physical objects;
    identifying, by the computing device, one or more specific regions of the first object for recognition based on the object type of the first object;
    identifying, by the computing device, one or more specific regions of the second object for recognition based on the object type of the second object;
    responsive to identifying the one or more specific regions, recognizing, by the computing device, text in the one or more specific regions of the first object;
    recognizing, by the computing device, text in the one or more specific regions of the second object;
    providing, by the computing device, the text recognized in the one or more specific regions of the first object to a security engine, the security engine configured to evaluate whether the text comprises sensitive information; and
    providing, by the computing device, the text in the one or more specific regions of the second object to the security engine.

2. The computer-implemented method of claim 1, further comprising:
    in response to the security engine determining that the text in the one or more specific regions of the first object does not comprise sensitive information, classifying, by the computing device, the first object as not including sensitive information.

3. The computer-implemented method of claim 1, further comprising:
    determining, by the computing device, whether text is present in the one or more specific regions of the first object; and
    in response to determining that no text is present in the one or more specific regions, classifying the object as not including sensitive information.

4. The computer-implemented method of claim 1, wherein a location of each specific region of the one or more specific regions is determined based on a known layout of the object type.

5. The computer-implemented method of claim 1, wherein the security engine is further configured to determine whether the text comprises sensitive information based on the metadata tagged on the text.

6. The computer-implemented method of claim 1, further comprising:
    determining that the image contains sensitive information based on the object type of the first object and the object type of the second object.

7. The computer-implemented method of claim 6, wherein it is determined that the image contains sensitive information responsive to the object type of the first object being a first particular type and the object type of the second object being a second, different particular object type.

8. The computer-implemented method of claim 1, wherein the security engine evaluates whether the text comprises sensitive information by matching the text in the one or more specific regions of the first object against a database of defined sensitive information.

9. The computer-implemented method of claim 1, further comprising:
automatically blocking the image from being electronically transferred in response to the text recognized in the one or more specific regions of the first object being evaluated as including sensitive information.

10. The computer-implemented method of claim 1, further comprising:
automatically transmitting an electronic message to an administrator in response to the text recognized in the one or more specific regions of the first object being evaluated as including sensitive information.

11. The computer-implemented method of claim 1 comprising:
adjusting a rotation or a perspective of the one or more specific regions using a determined rotation or perspective of the first object in order to facilitate text recognition within the one or more specific regions of the first object.

12. The computer-implemented method of claim 1, wherein the attributes comprise dimensions of the first object.

13. The computer-implemented method of claim 1, wherein the object type of the first object comprises a check.

14. The computer-implemented method of claim 13, wherein the check is identified based on attributes comprising MICR (Magnetic Ink Character Recognition) characters.

15. The computer-implemented method of claim 1, wherein the object type of the first object comprises a photo identification card.

16. The computer-implemented method of claim 15, wherein the photo identification card is identified based on attributes comprising an image of a face at a given location.

17. A non-transitory computer readable medium storing instructions that, when executed by a computing device having one or more processors, causes the one or more processors to perform operations comprising:
receiving, by a computing device, an image;
identifying, by the computing device, multiple physical objects represented in the image based on attributes of the multiple physical objects;
determining, by the computing device, an object type of a first object of the multiple physical objects;
determining, by the computing device, an object type of a second object of the multiple physical objects;
identifying, by the computing device, one or more specific regions of the first object for recognition based on the object type of the first object;
identifying, by the computing device, one or more specific regions of the second object for recognition based on the object type of the second object;
responsive to identifying the one or more specific regions, recognizing, by the computing device, text in the one or more specific regions of the first object;
recognizing, by the computing device, text in the one or more specific regions of the second object;
providing, by the computing device, the text recognized in the one or more specific regions of the first object to a security engine, the security engine configured to evaluate whether the text comprises sensitive information; and
providing, by the computing device, the text in the one or more specific regions of the second object to the security engine.

18. A computer system comprising:
a receiving module programmed to receive an image, at least one processor configured to execute the receiving module;
an object identification module programmed to identify multiple physical objects represented in the image based on attributes of the multiple physical objects, the at least one processor configured to execute the object identification module, the object identification module communicatively coupled to the receiving module;
an object analysis module programmed to determine an object type of a first object of the multiple physical objects, determine an object type of a second object of the multiple physical objects, identify one or more specific regions of the first object for recognition based on the object type of the first object, and identify one or more specific regions of the second object for recognition based on the object type of the second object, the at least one processor configured to execute the object analysis module, the object analysis module communicatively coupled to the object identification module; and
a text recognition module programmed to, responsive to identifying the one or more specific regions, recognize text in the one or more specific regions of the first object, recognize text in the one or more specific regions of the second object, tag the text recognized in each specific region of the one or more specific regions of the first object with metadata based on a location of the specific region on the first object, provide the text recognized in the one or more specific regions of the first object to a security engine, and provide the text in the one or more specific regions of the second object to the security engine, the metadata indicating a data type expected to be found at the location of the specific region on an object having the object type of the first object, the security engine configured to evaluate whether the text of the first object or the second object comprises sensitive information, the at least one processor configured to execute the text recognition module, the text recognition module communicatively coupled to the object analysis module.

* * * * *